United States Patent
Eto

(10) Patent No.: US 8,151,130 B2
(45) Date of Patent: Apr. 3, 2012

(54) PLURAL VOLTAGE LEVEL DETECTION UPON POWER DROP FOR SWITCHING TO STANDBY MODE WITH OR WITHOUT COMPLETE STATE SAVING INTERRUPT PROCESSING

(75) Inventor: Kimiharu Eto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 511 days.

(21) Appl. No.: 12/379,732

(22) Filed: Feb. 27, 2009

(65) Prior Publication Data

US 2010/0088503 A1    Apr. 8, 2010

(30) Foreign Application Priority Data

Oct. 7, 2008  (JP) ................................. 2008-260289

(51) Int. Cl.
*G06F 1/30* (2006.01)
(52) U.S. Cl. .................. 713/330; 712/229; 713/100
(58) Field of Classification Search .......... None
See application file for complete search history.

(56) References Cited

U.S. PATENT DOCUMENTS 6,236,869 B1 * 5/2001 Adachi et al. ................ 455/572
2005/0235168 A1 * 10/2005 Nonaka et al. ............... 713/300

FOREIGN PATENT DOCUMENTS

JP   62-080716      4/1987
JP   7-248858 A     9/1995

* cited by examiner

*Primary Examiner* — Kenneth Kim
(74) *Attorney, Agent, or Firm* — Foley & Lardner LLP

(57) ABSTRACT

A microcontroller including: a first voltage detection circuit that generates a first detection signal when a power supply voltage decreases to a voltage lower than a first voltage value; a second voltage detection circuit that generates a second detection signal when the power supply voltage decreases to a voltage lower than a second voltage value that is smaller than the first voltage value; a CPU that has a function of switching between a normal operation mode and a standby mode, performs an interrupt processing operation to shift from the normal operation mode to the standby mode when the first detection signal is generated, and shifts to the standby mode independently of the interrupt processing operation when the second detection signal is generated; and a first memory circuit that stores information indicating that the CPU has shifted to the standby mode before completing the interrupt processing operation.

16 Claims, 13 Drawing Sheets

PLURAL VOLTAGE LEVEL DETECTION UPON POWER DROP FOR SWITCHING TO STANDBY MODE WITH OR WITHOUT COMPLETE STATE SAVING INTERRUPT PROCESSING

BACKGROUND

1. Field of the Invention

The present invention relates to a microcontroller.

2. Description of Related Art

A technology for a microcontroller having a voltage detection function is disclosed in Japanese Unexamined Patent Application Publication No. 62-80716. A microcontroller 1 disclosed in Japanese Unexamined Patent Application Publication No. 62-80716 includes a reset circuit 2 and a CPU 3. The reset circuit 2 includes voltage detecting ICs 21 and 22. The CPU 3 includes an internal RAM 31 which is a memory for saving resister information.

When a power supply voltage VA is equal to or lower than a predetermined voltage VR, each of the voltage detecting ICs 21 and 22 outputs a non-maskable interrupt (NMI) signal Vnmi, which is a low-level interrupt signal, to the CPU 3. Note that the predetermined voltage VR is set to a voltage value at which the microcontroller 1 can normally operate. Further, the NMI signal Vnmi is low active.

When the power supply voltage VA drops, the voltage detecting IC 21 outputs the NMI signal Vnmi of low level to the CPU 3. Upon receiving the NMI signal Vnmi, the CPU 3 performs a pre-backup processing operation for saving register information in the internal RAM 31 according to an interrupt routine. After that, when the power supply voltage VA is equal to or lower than a voltage V1, which is lower than the voltage VR, an output signal Vstnby of the voltage detecting IC 22 is set to low level, thereby shifting the CPU 3 to the standby state. Note that the above-mentioned pre-backup processing operation requires at least a period of time to save the register information in the internal RAM 31, and the time necessary for the pre-backup processing operation is set as a period Tpo. To secure the period Tpo, the capacity of a smoothing capacitor of a power supply circuit that supplies the power supply voltage VA is set.

As described above, when the power supply voltage VA fluctuates and decreases to a voltage lower than the voltage VR, the microcontroller 1 saves information necessary for the RAM 31 from the CPU 3 and backs up data.

SUMMARY

The microcontroller 1 requires at least the period Tpo from the time when the power supply voltage VA is equal to or lower than the predetermined voltage VR to the time when the power supply voltage VA reaches the voltage V1. This is because it is necessary to complete the pre-backup processing operation for saving the register information in the internal RAM 31 during the period Tpo. Further, when the power supply voltage VA rises due to an operation such as a charging operation, for example, the use of the data, which is stored in the internal RAM 31 through the pre-backup processing operation carried out during the period Tpo, enables the microcontroller 1 to return to the normal operating state.

However, when the power supply voltage VA rapidly decreases to a voltage equal to or lower than the voltage V1 due to a failure or the like of the power supply circuit, before the period Tpo expires, for example, the pre-backup processing operation for saving the register information in the internal RAM 31 is not completed by the CPU 3. Further, the pre-backup processing operation is finished in the middle of processing. In this case, when the power supply voltage VA increases to a voltage equal to or higher than the predetermined voltage VR again and the microcontroller 1 is shifted to the normal operation mode, the CPU 3 resumes operation based on the backup data stored in the internal RAM 31. As described above, however, the data stored in the internal RAM 31 is backed up based on the pre-backup processing operation which is finished in the middle of processing, and thus the data is not stored with correct data values. Accordingly, when the CPU 3 resumes operation based on the incorrect data, the CPU 3 may malfunction.

Further, in order to secure the sufficiently long period T1, it is necessary to increase the capacity of the smoothing capacitor provided in the power supply circuit. In this case, however, the capacitor having an extremely large capacity is used, resulting in an increase in circuit size. Furthermore, there arises a problem of an increase in a start-up time for a circuit to charge the smoothing capacitor having a large capacity.

A first exemplary aspect of an embodiment of the present invention is a microcontroller including: a first voltage detection circuit that generates a first detection signal when a power supply voltage decreases to a voltage equal to or lower than a first voltage value; a second voltage detection circuit that generates a second detection signal when the power supply voltage decreases to a voltage equal to or lower than a second voltage value, the second voltage value being smaller than the first voltage value; a central processing circuit that has a function of switching between a normal operation mode to carry out a normal operation and a standby mode to operate with power consumption lower than that necessary for the normal operation, performs an interrupt processing operation to shift from the normal operation mode to the standby mode when the first detection signal is generated, and shifts to the standby mode independently of the interrupt processing operation when the second detection signal is generated; and a first memory circuit that stores information indicating that the central processing circuit has shifted to the standby mode before completing the interrupt processing operation.

The microcontroller according to an exemplary embodiment of the present invention is capable of determining whether the interrupt processing operation to shift from the normal operation to the standby operation is completed or not, based on the information stored in the first memory circuit. Accordingly, in the case where the power supply voltage rises and the microcontroller operates in the normal operation mode, when the interrupt processing operation is not fully completed, processing such as reset processing is executed, thereby making it possible to prevent a malfunction from occurring in the central processing circuit.

The microcontroller according to an exemplary embodiment of the present invention is capable of preventing a malfunction from occurring after returning from the standby mode.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
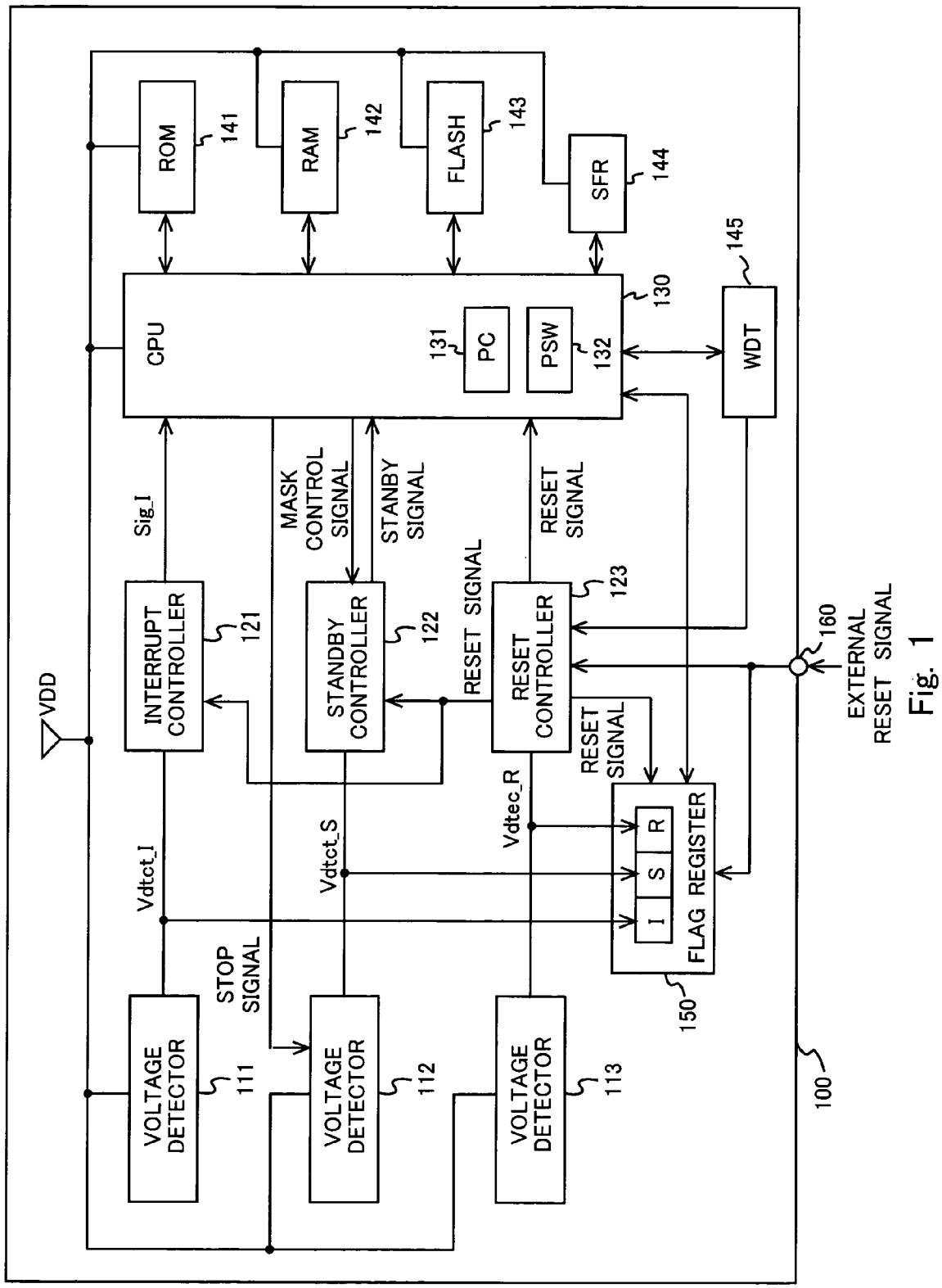
FIG. 1 shows an example of the configuration of a microcontroller according to a first exemplary embodiment of the present invention.

Hereinafter, a first exemplary embodiment to which the present invention is applied will be described in detail with reference to the drawings. FIG. 1 shows an example of the configuration of a microcontroller 100 according to the first exemplary embodiment of the present invention. As shown in FIG. 1, the microcontroller 100 includes voltage detectors 111 to 113, an interrupt controller 121, a standby controller 122, a reset controller 123, a CPU 130, a ROM 141, a RAM 142, a flash memory 143, a special function register 144, a flag register 150, and an external reset signal input terminal 160.

The CPU (central processing circuit) 130 is a central control unit that performs various processing within the microcontroller 100 based on a control program and input data when the microcontroller 100 operates in a normal operation mode. Further, the CPU 130 includes a program counter (PC) 131 and a processor status word (PSW) 132, and operates using a power supply voltage VDD as a power supply. The program counter 131 stores an address of, for example, the RAM 142 storing instructions to be subsequently executed by the CPU 130. The processor status word 132 holds a state of a processor, such as a current operation mode of the CPU 130 and a state in which an overflow occurs in an operation unit. Furthermore, the CPU 130 stops operating when the microcontroller 100 operates in a standby mode.

The term "standby model" of the microcontroller 100 as used in the first exemplary embodiment refers to a state in which the CPU 130 interrupts the processing operation carried out under the normal operation mode. Since the CPU 130 does not operate in the standby mode, the RAM 142, the flash memory 143, the special function register 144, and the like, each of which stores a CPU instruction, also stop operating. As a result, the system of the microcontroller 100 is in a substantially stopped state, which enables the microcontroller 100 to operate with low power consumption. Note that, in the standby mode, the data stored in the RAM 142, the special function register 144, and the like is held. Accordingly, to prevent the memory data from being destroyed, a minimum amount of power is supplied to the RAM 142, the special function register 144, and the like. It is assumed that the CPU 130 does not stop operating completely during the standby mode, and upon receiving an interrupt signal Sig_I and a reset signal, which are described later, the CPU 130 executes a processing operation in response to the received signal.

Hereinafter, it is assumed that the phrase "the CPU 130 is in the standby state" also indicates that the microcontroller 100 is in the standby mode, and the phrase "the CPU 130 is in the normal operation mode" also indicates that the microcontroller 100 is in the normal operation mode.

Note that, as another aspect of the standby mode, an operating state in which an operating clock frequency of the CPU 130 is reduced, for example, may be adopted. In this case, the CPU 130 shifts to a low power consumption mode, and thus the CPU 130 can operate even when the power supply voltage VDD further decreases. Thus, the term "standby" is defined as an operation mode in which the system of the microcontroller 100 does not malfunction even in the state in which the power supply voltage VDD is lower than the level obtained during the normal operation.

The ROM 141 stores a control program for use in processing executed by the CPU 130. The ROM 141 is a read-only memory and cannot rewrite the data held therein, for example. The RAM 142 is a main memory used by the CPU 130 and is used to develop the CPU instruction such as the control program or data read out from the ROM 141, the flash memory 143, and the like. The CPU 130 performs a processing operation according to the CPU instruction. The RAM 142 cannot hold the stored data without the supply of the power supply voltage. As described above, when the CPU 130 is in the standby state, that is, when the CPU 130 stops operating, the RAM 142 storing the CPU instruction also stops operating.

The flash memory 143 is a non-volatile memory and can hold stored information without the supply of the power supply voltage. Further, the flash memory 143 can rewrite information, for example. Like the RAM 142, the flash memory 143 can also store the CPU instruction and data, and stops operating when the CPU 130 is in the standby state.

The special function register 144 is a register for use in determining the operation of the CPU 130 and checking the operating state. When the CPU 130 is in the standby state, the special function register 144 also stops operating.

The voltage detector 111 monitors the power supply voltage VDD, and outputs a detection signal Vdtct_I of high level to the interrupt controller 121 when the power supply voltage VDD drops to a predetermined voltage value VI. Further, when the power supply voltage VDD is equal to or higher than the predetermined voltage value VI, the voltage detector 111 outputs the detection signal Vdtct_I of low level to the interrupt controller 121. The voltage VI is set to, for example, a potential (about 2.9 V, for example) which is a little higher than a voltage 2.7 V that is necessary for the CPU 130 to write/read data to/from the flash memory 143.

Upon receiving the detection signal Vdtct_I of high level, the interrupt controller 121 sends an interrupt signal Sig_I to cause the CPU 130 to start an interrupt processing operation for shifting to the standby state. Accordingly, the CPU 130 invokes an interrupt routine for shifting to the standby state, from the ROM 141, the RAM 142, or the like, and executes the processing operation. In the processing operation for shifting the standby state, the following processing is performed, for example. That is, pieces of information closely related to the CPU processing operation, such as information about the program counter 131 and the processor status word 132, which are provided in the CPU 130, and register information of the special function register 144, are saved in the RAM 142 or the flash memory 143 (this processing operation is hereinafter referred to as "saving processing for stand-by"). Note that each of the RAM 142 and the flash memory 143 can also be called a memory circuit (second memory circuit) for use in backing up the saved information.

In this case, upon completion of the saving processing for stand-by, the CPU 130 outputs a mask control signal to the flag register 150. Alternatively, upon completion of the saving processing for stand-by, the CPU 130 may send an operation stop signal to the voltage detector 112 so that the voltage detector 112 is controlled not to operate. Furthermore, the CPU 130 may also send the operation stop signal to the standby controller 122 so that the standby controller 122 is controlled not to operate.

Further, upon receiving the detection signal Vdtct_I of low level, the interrupt controller 121 sends the interrupt signal Sig_I to cause the CPU 130, the operation of which is suspended under the standby mode, to start and return to the normal operation mode. Accordingly, the CPU 130 invokes an interrupt routine for returning from the standby state, from the ROM 141 or the like, and executes the processing operation for returning from the standby state (this processing operation is hereinafter referred to as "stand-by return processing"). In the stand-by return processing, the CPU 130 determines whether to return to the state immediately before the standby state, based on the data saved in the above-mentioned RAM 142, flash memory 143, or the like, according to values of flags "I", "S", and "R" which are stored in the flag register 150 described later.

Further, since the power supply voltage VDD is equal to or higher than the voltage VI during the stand-by return processing, the CPU 130 is operable in the normal operation mode. Accordingly, the CPU 130 may reset the values of the flags stored in the flag register 150 described later, that is, the CPU 130 may set each of the values to "0".

The voltage detector 112 monitors the power supply voltage VDD, and outputs a detection signal Vdtct_S of high level to the standby controller 122 when the power supply voltage VDD drops to a predetermined voltage value VS. Note that the relation between the voltage values VI and VS is expressed as VI>VS. In the case of receiving the operation stop signal from the CPU 130, the voltage detector 112 does not output the detection signal Vdtct_S of high level. When the power supply voltage VDD is equal to or higher than the predetermined voltage value VS, the voltage detector 112 outputs the detection signal Vdtct_S of low level to the standby controller 122.

It is assumed herein that a voltage equal to or lower than the voltage VS is not enough for the CPU 130 to carry out the normal processing operation in the normal operation mode, and may malfunction. Accordingly, when the power supply voltage VDD becomes equal to or lower than the voltage VS during the saving processing for stand-by, there is a possibility that the interrupt processing cannot be normally performed. In this case, in the saving processing for stand-by, the accuracy of the information written to the RAM 142 and the flash memory 143 is not guaranteed. Moreover, there is also a possibility that the CPU 130 malfunctions and other data stored in the RAM 142 and the flash memory 143 is destroyed.

Upon receiving the detection signal Vdtct_S of high level, the standby controller 122 outputs a standby signal to the CPU 130. The CPU 130 is forcibly shifted to the standby state in response to the standby signal output from the standby controller 122. In the case where the saving processing for stand-by has already been completed, the CPU 130 has already shifted to the standby state, and thus the standby signal is ignored. Note that, when receiving the operation stop signal from the CPU 130, the standby controller 122 does not output the standby signal.

The voltage detector 113 monitors the power supply voltage VDD, and outputs a detection signal Vdtct_R of high level to the reset controller 123 when the power supply voltage VDD drops to a predetermined voltage value VR. Note that the relation between the voltage values VS and VR is expressed as VS>VR. It is assumed herein that a voltage equal to or lower than the voltage VR is not enough for the CPU 130 to operate and is also not enough for the RAM 142 and the special function register 144 to perform an operation for holding the stored information.

Upon receiving the detection signal Vdtct_R of high level, the reset controller 123 outputs a reset signal to the CPU 130. The reset signal causes the CPU 130, the RAM 142, the flag register 150 described later, and the like to reset. That is, the system of the microcontroller 100 is reset. Further, the reset controller 123 outputs the reset signal to the CPU 130 and the like also in response to an external reset signal input from the external reset signal input terminal 160, and signals of a watchdog timer 145 and the like, thereby enabling the CPU 130 and the like to reset. Note that, since the flash memory 143 is a non-volatile memory, the held information is not reset at this time. However, since the entire system of the microcontroller 100 is reset as described above, when the microcontroller 100 shifts to the normal operation mode thereafter, the CPU 130 discards (resets) the information stored in the flash memory 143 during the saving processing for stand-by.

Figure 2:
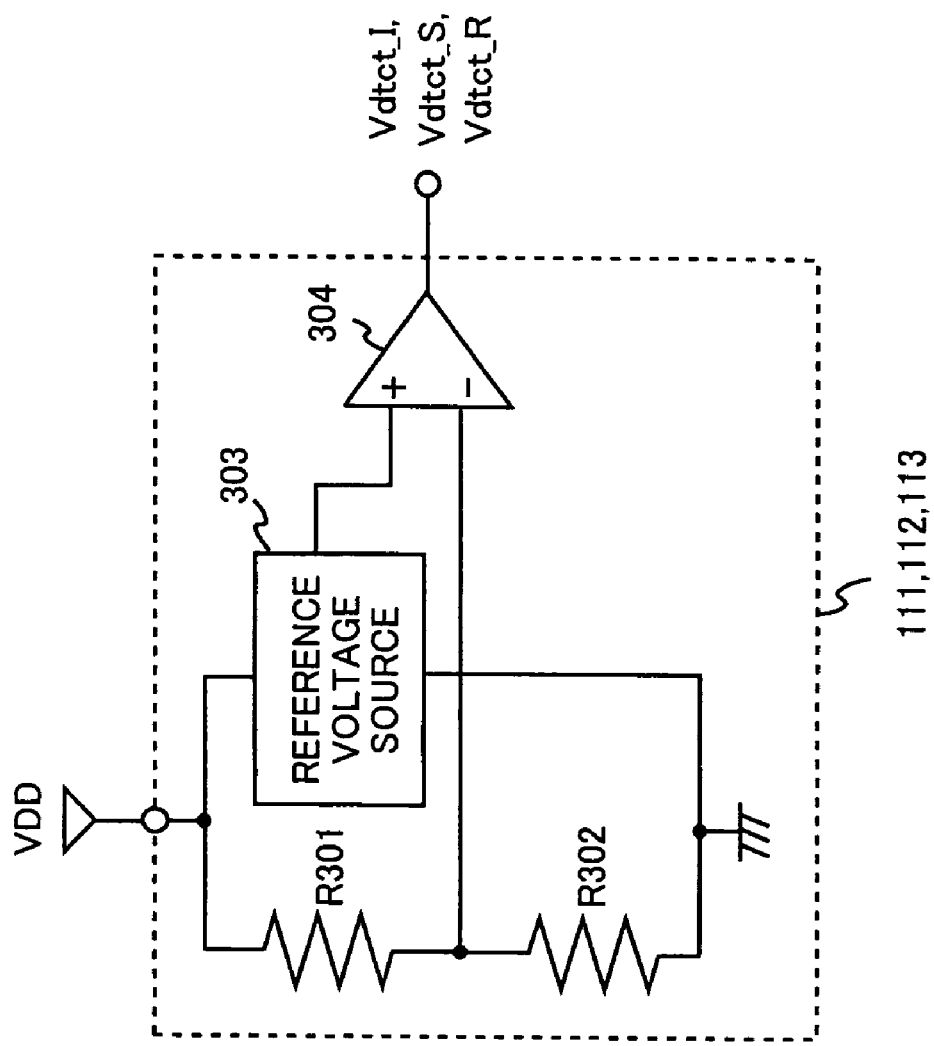
FIG. 2 shows an example of the configuration of a voltage detector according to the first exemplary embodiment.

FIG. 2 shows an example of a circuit configuration of each of the voltage detectors 111 to 113. Note that the voltage detectors 111 to 113 have the same configuration, so the configuration of the voltage detector 111 is described by way of example. The voltage detector 111 includes resistor elements R301 and R302, a reference voltage source 303, and a comparator 304. The resistor elements R301 and R302 are connected in series between the power supply voltage VDD and a ground voltage GND. An intermediate node between the resistor elements R301 and R302 is input to an inverting input terminal of the comparator 304. The reference voltage source 303 inputs a predetermined voltage to a non-inverting input terminal of the comparator 304. A voltage generated by the reference voltage source 303 is set to a voltage value equal to a potential at the intermediate node between the register elements R301 and R302 which is obtained when the power supply voltage VDD reaches the voltage VI. The comparator 304 compares a voltage at the inverting input terminal with a voltage at the non-inverting input terminal, and outputs a comparison result from an output terminal. The output signal from the comparator 304 serves as the detection signal Vdtct_I.

In this configuration, when the power supply voltage VDD is equal to or lower than the voltage VI, the voltage detector 111 outputs the high-level signal, that is, the detection signal Vdtct_I having a logical value of "1". Similarly, the voltage detectors 112 and 113 respectively output the high-level signals, that is, the detection signals Vdtct_S and Vdtct_R each having a logical value of "1", when the power supply voltage VDD is equal to or lower than voltages VS and VR.

The flag register 150 (first memory circuit) changes the values of "I", "S", and "R" according to the values of the detection signals Vdtct_I, Vdtct_S, and Vdtct_R, which are respectively output from the voltage detectors 111 to 113, and stores the changed values. Specifically, when the detection signal Vdtct_I becomes high level, the value of the flag "I", changes from "0" to "1". Further, when the detection signal Vdtct_S becomes high level, the value of the flag "S" changes from "0" to "1". When the detection signal Vdtct_R becomes high level, the value of the flag "R" changes from "0" to "1". Note that, when the above-mentioned saving processing for stand-by is completed, the flag register 150 receives the mask control signal from the CPU 130. Upon receiving the mask control signal, the flag register 150 masks the value of the flag "S", thereby preventing the value from being rewritten to "1" even when the detection signal Vdtct_S becomes high level. Note that, when the voltage detector 112 stops operating in response to the operation stop signal from the CPU 130, it is not necessary to perform the mask processing.

Note that, each flag value changed when each of the detection signals becomes high level is not reset to "0" but is held at "1" even when each of the detection signals becomes low level. Then, the CPU 130 having returned from the standby state to the normal operation mode checks the values of the flags and executes return processing according to the values. After the microcontroller 100 has shifted to the normal operation mode, the CPU 130 initializes the flag register 150 and resets all the values of the flags to "0".

In this case, when the power supply voltage VDD becomes lower than the voltage VR, the flag register 150 is also reset by the reset controller 123. It is assumed that the value of the flag "R" is not reset and held at "1". It is also assumed that the flag register 150 includes a logic circuit that is operable at low voltage, and is capable of holding the stored values of the flags even when the power supply voltage VDD becomes lower than the voltage VR.

The external reset signal input terminal 160 receives the external reset signal. Upon receiving the external reset signal, the reset controller 123 outputs the reset signal to the CPU 130 and the like independently of the detection voltage signal Vdtct_R. Further, the external reset signal may cause the flag register 150 to reset. It is assumed that, in a similar manner as the above-mentioned operation, the value of the flag "R" is not reset but is held at "1".

Next, operations of the microcontroller 100 according to the first exemplary embodiment will be described in detail with reference to the drawings. FIGS. 3 to 6 respectively show signal waveforms of the detection signals Vdtct_I, Vdtct_S, and Vdtct_R corresponding to four patterns in which the power supply voltage VD drops and rises again. FIGS. 3 to 6 also show the values of the flags of the flag register 150.

Figure 3:
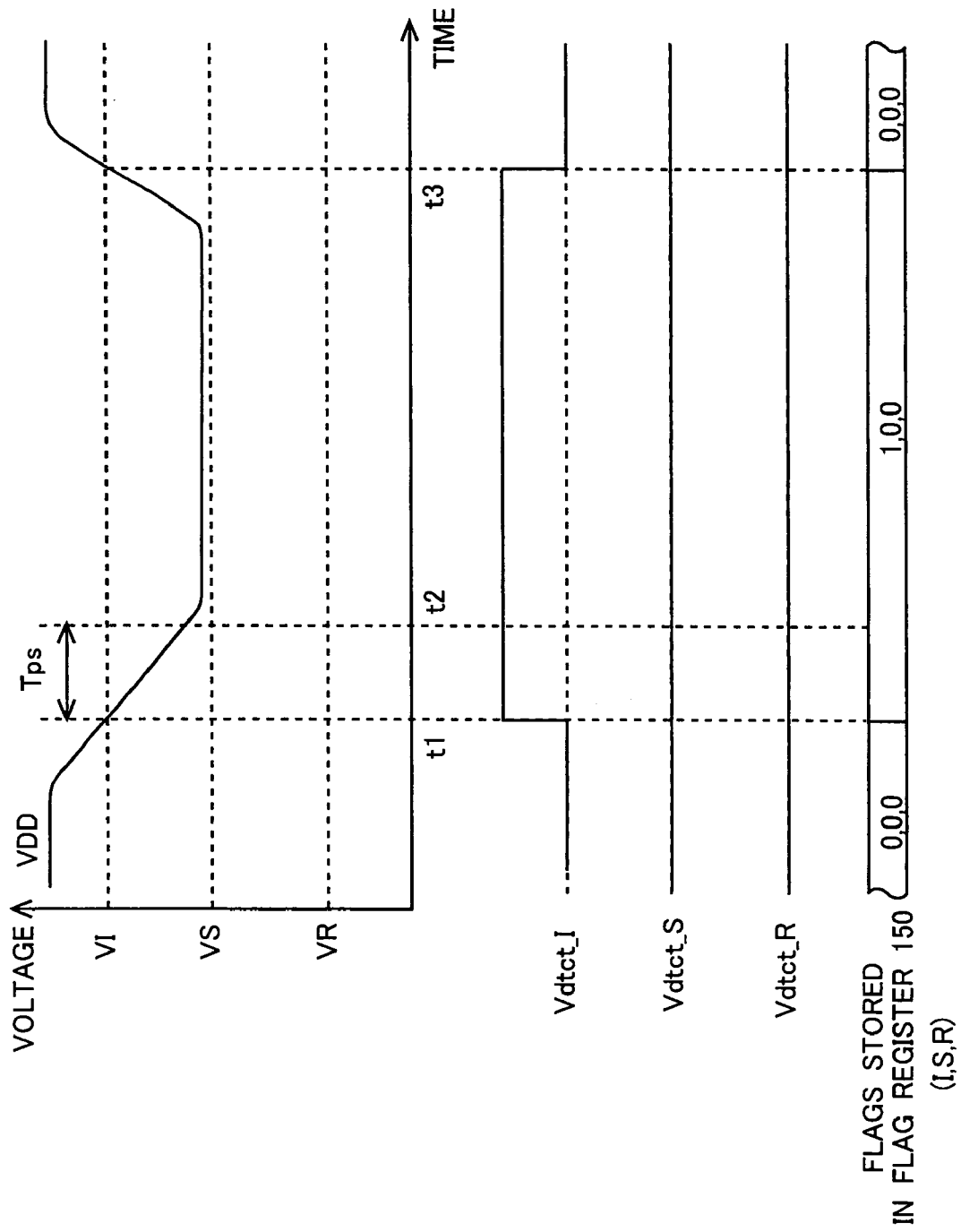
FIG. 3 is a timing diagram illustrating an operation of the microcontroller according to the first exemplary embodiment.

In a pattern shown in FIG. 3, the power supply voltage VDD is equal to or higher than the voltage VI before a time t1. Accordingly, the microcontroller 100 performs the normal operation and the CPU 130 performs the normal processing operation. At the time t1, the power supply voltage VDD decreases from the voltage VI. Accordingly, the voltage detector 111 outputs the detection signal Vdtct_I of high level to the interrupt controller 121. Further, the value of the flag "I" of the flag register 150 is rewritten from "0" to "1".

Upon receiving the detection signal Vdtct_I of high level, the interrupt controller 121 outputs the interrupt signal Sig_I for setting the CPU 130 in the standby state. The CPU 130 interrupts the normal operation in response to the interrupt signal Sig_I, and starts the saving processing for stand-by.

The saving processing operation for standby requires a period Tps and is completed at a time t2, and the CPU 130 shifts to the standby mode. Thus, the microcontroller 100 is in the standby mode.

After that, the power supply voltage VDD is not reduced to a voltage equal to or lower than the voltage VS, and increases again to a voltage equal to or higher than the voltage VI at a time t3. Accordingly, the voltage detector 111 outputs the detection signal Vdtct_I of low level to the interrupt controller 121. The CPU 130 starts the stand-by return processing for returning to the normal operation mode in response to the interrupt signal Sig_I from the interrupt controller 121. In the stand-by return processing, the CPU 130 checks the values of the flags "I", "S", and "R" of the flag register 150. After confirming that the value of the flag "I" is "1" and the value of each of the flags "S" and "R" is "0", the CPU 130 determines that the information saved in the RAM 142 and the flash memory 143 during the saving processing for stand-by is stored with correct values. After that, the CPU 130 uses the information saved in the RAM 142 and the flash memory 143 to return to the state immediately before the standby state. Further, the microcontroller 100 shifts to the normal operation mode, and then the CPU 130 resets the flag register 150.

Note that, after the microcontroller 100 shifts to the standby mode from the time t2 of FIG. 3, the power supply voltage VDD may decrease to a voltage equal to or lower than the voltage VS. In this case, the CPU 130 has already shifted to the standby state by the time t2. Accordingly, when the power supply voltage VDD decreases to a voltage equal to or lower than the voltage VS, the CPU 130 is not forcibly shifted to the standby state. Thus, even if the power supply voltage VDD decreases to a voltage equal to or lower than the power supply voltage VDD, no problem occurs in the system of the microcontroller 100. Further, in this case, after the saving processing for stand-by is completed, the flag register 150 masks the value of the flag "S" in response to the mask control signal from the CPU 130. Accordingly, the value of the flag "S" is not changed and remains "0". After that, when the power supply voltage VDD becomes higher than the voltage VI and the CPU 130 returns to the normal operation mode, the CPU 130 confirms that the value of the flag "I" of the flag register 150 is "1" and the value of each of the flags "S" and "R" of the flag register 150 is "0" in the return processing, thereby determining that the information saved in the RAM 142 and the flash memory 143 during the saving processing for stand-by is stored with correct values.

Further, after the microcontroller 100 shifts to the standby mode from the time t2, the power supply voltage VDD may decrease to a voltage equal to or lower than the voltage VR. Also in this case, the CPU 130 has already shifted to the standby state, and the value of the flag "S" of the flag register 150 remains "0" until the power supply voltage VDD becomes equal to or lower than the voltage VR. After that, the power supply voltage VDD becomes equal to or lower than the voltage VR, and the voltage detector 113 outputs the detection signal Vdtct_R of high level to the reset controller 123. The reset controller 123 outputs the reset signal to the CPU 130 to reset the system of the microcontroller 100 (reset the RAM 142 and the like). Further, the value of the flag "R" of the flag register 150 is set to "1", and the value of each of the flags "I" and "S" of the flag register 150 is set to "0". After that, when the power supply voltage VDD becomes higher than the voltage VI and the CPU 130 returns to the normal operation mode, the CPU 130 checks the values of the flags, which are stored in the flag register 150, in the stand-by return processing. Then, the CPU 130 confirms that the value of the flag "R" is "1", thereby determining that the system of the microcontroller 100 is reset. After that, the CPU 130 discards the information saved in the flash memory 143 and initializes the system of the microcontroller 100.

Figure 4:
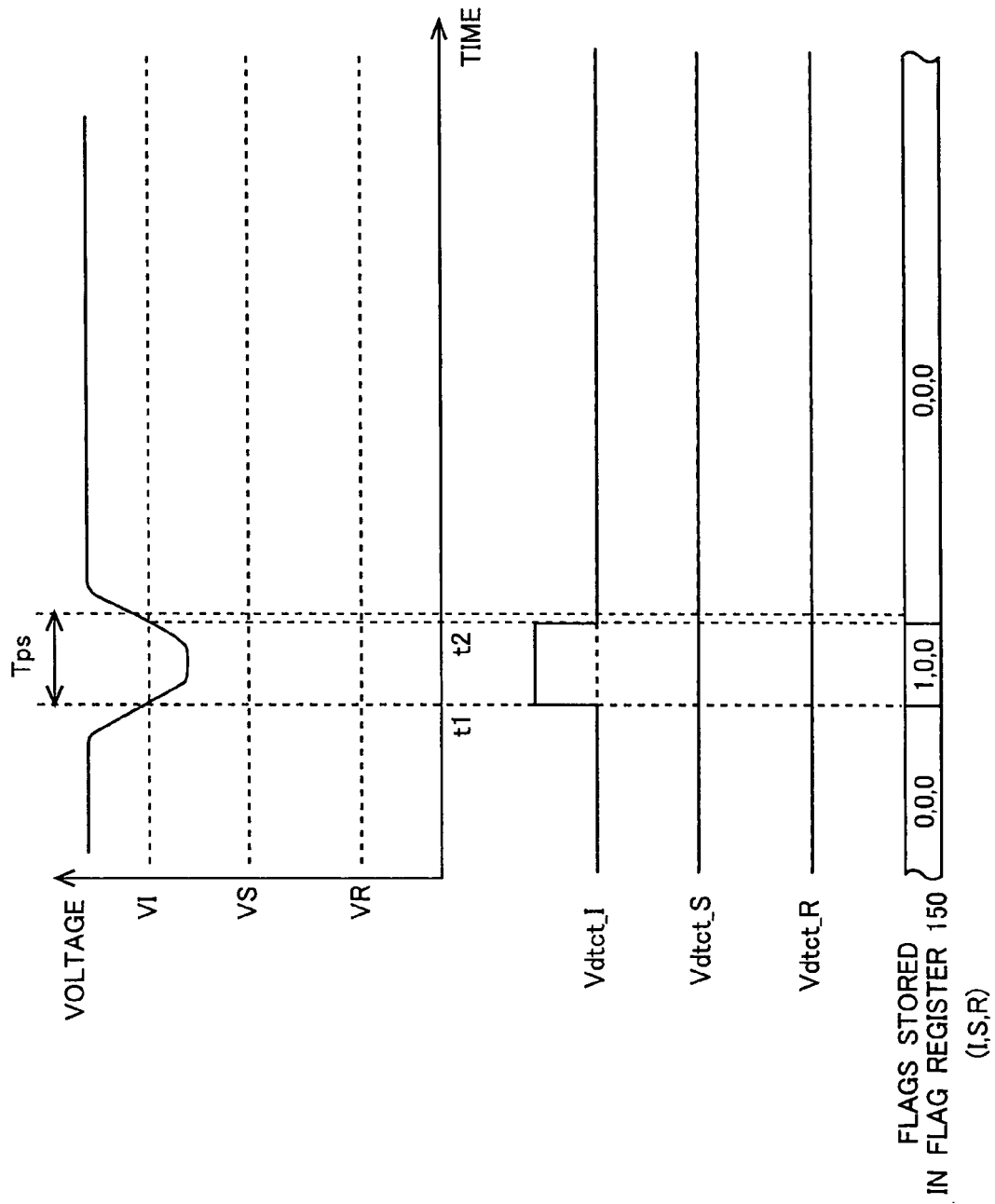
FIG. 4 is a timing diagram illustrating an operation of the microcontroller according to the first exemplary embodiment.

Further, in a pattern shown in FIG. 4, the power supply voltage VDD becomes lower than the voltage VI at the time t1, and the interrupt processing for the microcontroller 100 to shift to the standby mode is started. However, the power supply voltage VDD increases to a voltage higher than the voltage VI again at the time t2 in the period Tps during which the interrupt processing is completed. In this case, the voltage detector 111 outputs the detection signal Vdtct_I of low level to the interrupt controller 121 at the time t2. In response to the interrupt signal Sig_I from the interrupt controller 121, the CPU 130 interrupts the stand-by return processing and returns to the normal operation mode. In this case, since the CPU 130 is not shifted to the standby state, the CPU 130 does not use the information saved in the RAM 142 and the flash memory 143 during the processing for returning to the normal operation mode. In a similar manner as in the pattern shown in FIG. 3, the CPU 130 resets the flag register 150 after shifting to the normal operation mode.

Figure 5:
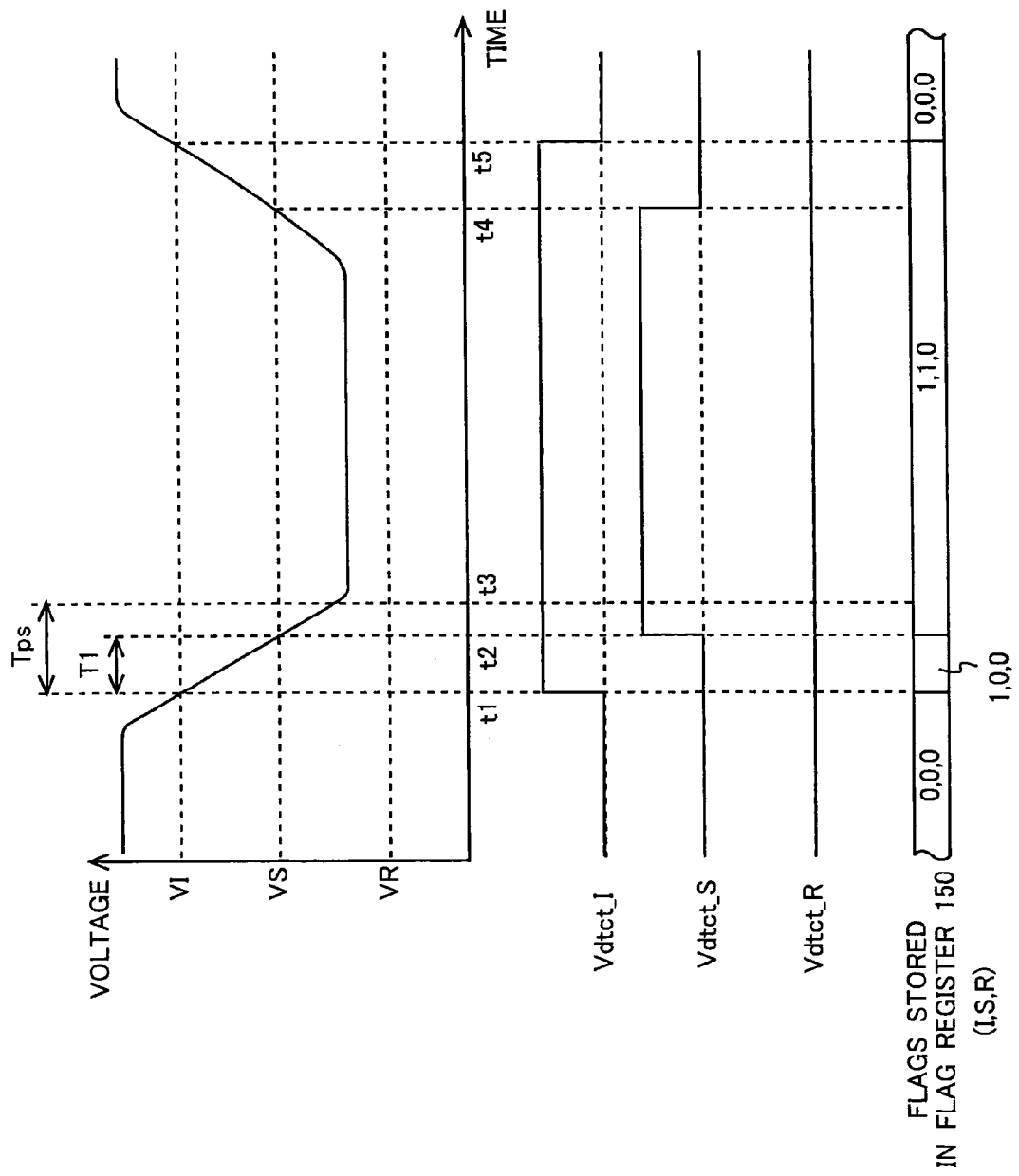
FIG. 5 is a timing diagram illustrating an operation of the microcontroller according to the first exemplary embodiment.

Next, a pattern shown in FIG. 5 is described. Before the time t1, the pattern of FIG. 5 is similar to the pattern of FIG. 3. At the time t1, the power supply voltage VDD becomes lower than the voltage VI. After that, in a similar manner as in the pattern of FIG. 3, the CPU 130 interrupts the normal operation in response to the interrupt signal Sig_I from the interrupt controller 121, and starts the interrupt processing operation for shifting to the standby state. However, unlike the pattern shown in FIG. 3, the power supply voltage VDD decreases to a voltage lower than the voltage VS at the time t2 prior to the time t3 at which the saving processing for stand-by is fully completed. That is, the power supply voltage VDD decreases to a voltage lower than the voltage VS, from the time t1 during a period T1 which is shorter than the period Tps. Accordingly, the voltage detector 112 outputs the detection signal Vdtct_S of high level to the standby controller 122. The CPU 130 interrupts the saving processing for stand-by in response to the standby signal from the standby controller 122, and is forcibly shifted to the standby state. Further, in this case, the value of the flag "S" of the flag register 150 is rewritten from "0" to "1".

After that, the power supply voltage VDD increases to a voltage higher than the voltage VS at a time t4, and further increases to a voltage higher than the voltage VI at a time t5. Accordingly, the voltage detector 111 outputs the detection signal Vdtct_I of low level to the interrupt controller 121 at the time t5. The interrupt controller 121 outputs the interrupt signal Sig_I corresponding to the detection signal Vdtct_I of low level to the CPU 130. Upon receiving the interrupt signal Sig_I, the CPU 130 starts the stand-by return processing. In the stand-by return processing, the CPU 130 checks the values of the flags stored in the flag register 150. Then, the CPU 130 confirms that the value of each of the flags "I" and "S" is "1" and the value of the flag "R" is "0". Thus, the CPU 130 determines that the saving processing for stand-by is interrupted and the information saved in the RAM 142 and the flash memory 143 is not stored with correct values. After that, the CPU 130 discards the information saved in the RAM 142 and the flash memory 143, and initializes the system of the microcontroller 100.

Note that, in the pattern of FIG. 5, the CPU 130 starts the stand-by return processing at the time when the power supply voltage VDD becomes higher than the voltage VI. Alternatively, the CPU 130 may start the return processing at the time (time t4) when the power supply voltage VDD increases to a voltage equal to or higher than the voltage VS.

Figure 6:
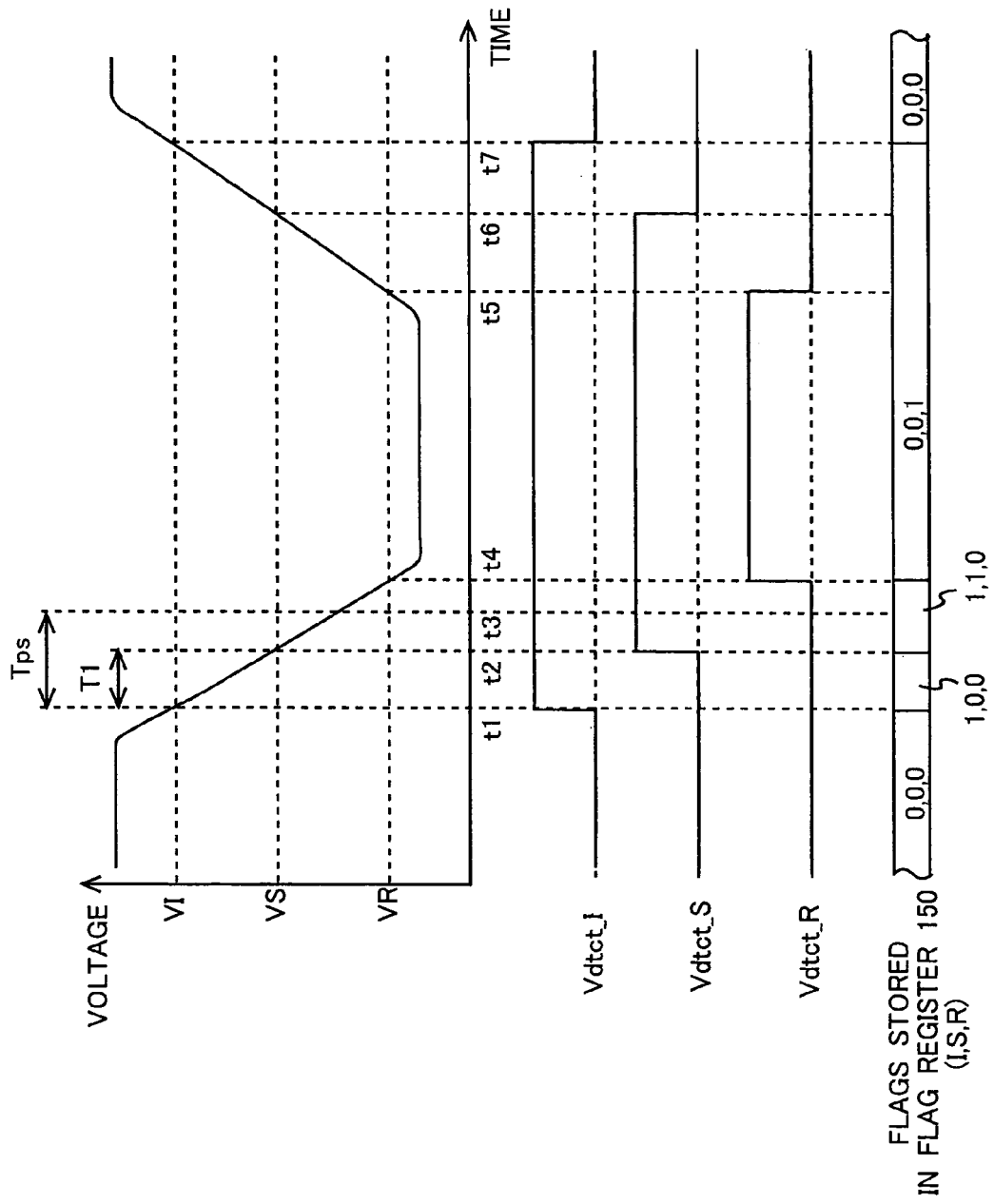
FIG. 6 is a timing diagram illustrating an operation of the microcontroller according to the first exemplary embodiment.

Further, in a pattern shown in FIG. 6, in a similar manner as in the pattern of FIG. 5, the power supply voltage VDD decreases to a voltage lower than the voltage VS at the time t2 prior to the time t3 at which the saving processing for stand-by is fully completed. Accordingly, in a similar manner as in the pattern of FIG. 5, the CPU 130 interrupts the saving processing for stand-by, and is forcibly shifted to the standby state. Thus, the value of the flag "S" of the flag register 150 is set to "1". Then, the power supply voltage VDD further decreases to a voltage lower than the voltage VR at the time t4. Accordingly, the voltage detector 113 outputs the detection signal Vdtct_R of high level to the reset controller 123. Further, the value of the flag "R" of the flag register 150 is rewritten from "0" to "1".

Then, the reset controller 123 outputs the rest signal to the CPU 130 to reset the CPU 130. As a result, the program counter 131, the processor status word 132, and the like, which are provided in the CPU 130, are reset. Subsequently, the RAM 142, the special function register 144, and the like are also reset, with the result that the system of the microcontroller 100 is reset. Note that the value of the flag "R" of the flag register 150 is not reset and is held at "1".

After that, the power supply voltage VDD increases to a voltage higher than the voltage VR at the time t5, and further increases to a voltage higher than the voltage VS at a time t6. Furthermore, the power supply voltage VDD becomes higher than the voltage VI at a time t7, and the CPU 130 starts the stand-by return processing in a similar manner as in the pattern of FIG. 5. In the stand-by return processing, the CPU 130 checks the values of the flags stored in the flag register 150. Then, the CPU 130 confirms that the value of the flag "R" is "1". As a result, the CPU 130 determines that the system of the microcontroller 100 is reset. After that, the CPU 130 discards the information saved in the flash memory 143 and initializes the system of the microcontroller 100.

Figure 7:
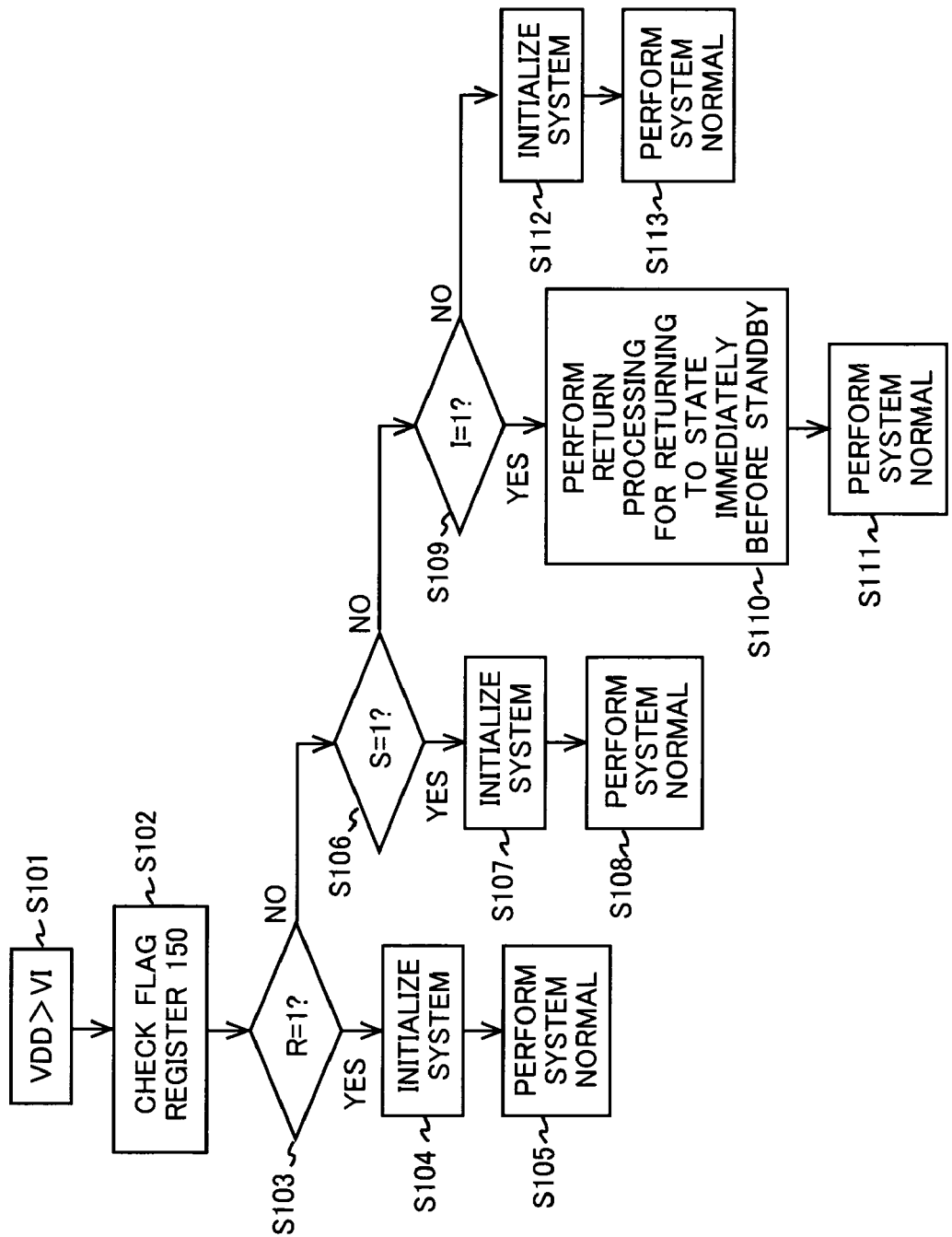
FIG. 7 is a flowchart illustrating a procedure for returning to a normal operation mode of the microcontroller according to the first exemplary embodiment.

Referring now to the flowchart of FIG. 7, a description is given of a procedure for the microcontroller 100 to return from the standby state to the normal operation mode operation. As shown in FIG. 7, when the power supply voltage VDD is higher than the voltage VI (S101), the CPU 130 checks the values of the flags stored in the flag register 150 (S102). It is determined whether the value of the flag "R" is "1" (S103). When R=1 is satisfied (YES in S103), the system of the microcontroller 100 is initialized (S104). After that, the microcontroller 100 performs a normal system operation (S105).

When R=1 is not satisfied but R=0 is established (NO in S103), the CPU 130 determines whether the value of the flag "S" is "1" (S106). When S=1 is satisfied (YES in S106), the CPU 130 assumes that the saving processing for stand-by is finished in the middle of processing, and initializes the system of the microcontroller 100 (S107). After that, the microcontroller 100 performs the normal system operation (S108).

When S=1 is not satisfied but S=0 is established (NO in S106), the CPU 130 determines whether the value of the flag "I" is "1" (S109). When I=1 is satisfied (YES in S109), the CPU 130 assumes that the saving processing for stand-by is completed, and carries out the processing for returning to the state immediately before the standby state, based on the information backed up to the RAM 142 and the like (S110). After that, the microcontroller 100 performs the normal system operation (S111).

When I=1 is not satisfied but I=0 is established (NO in S109), the microcontroller 100 is in an initial state of power up, and thus the CPU 130 initializes the system of the microcontroller 100 (S112). After that, the microcontroller 100 performs the normal system operation (S113).

Figure 8:
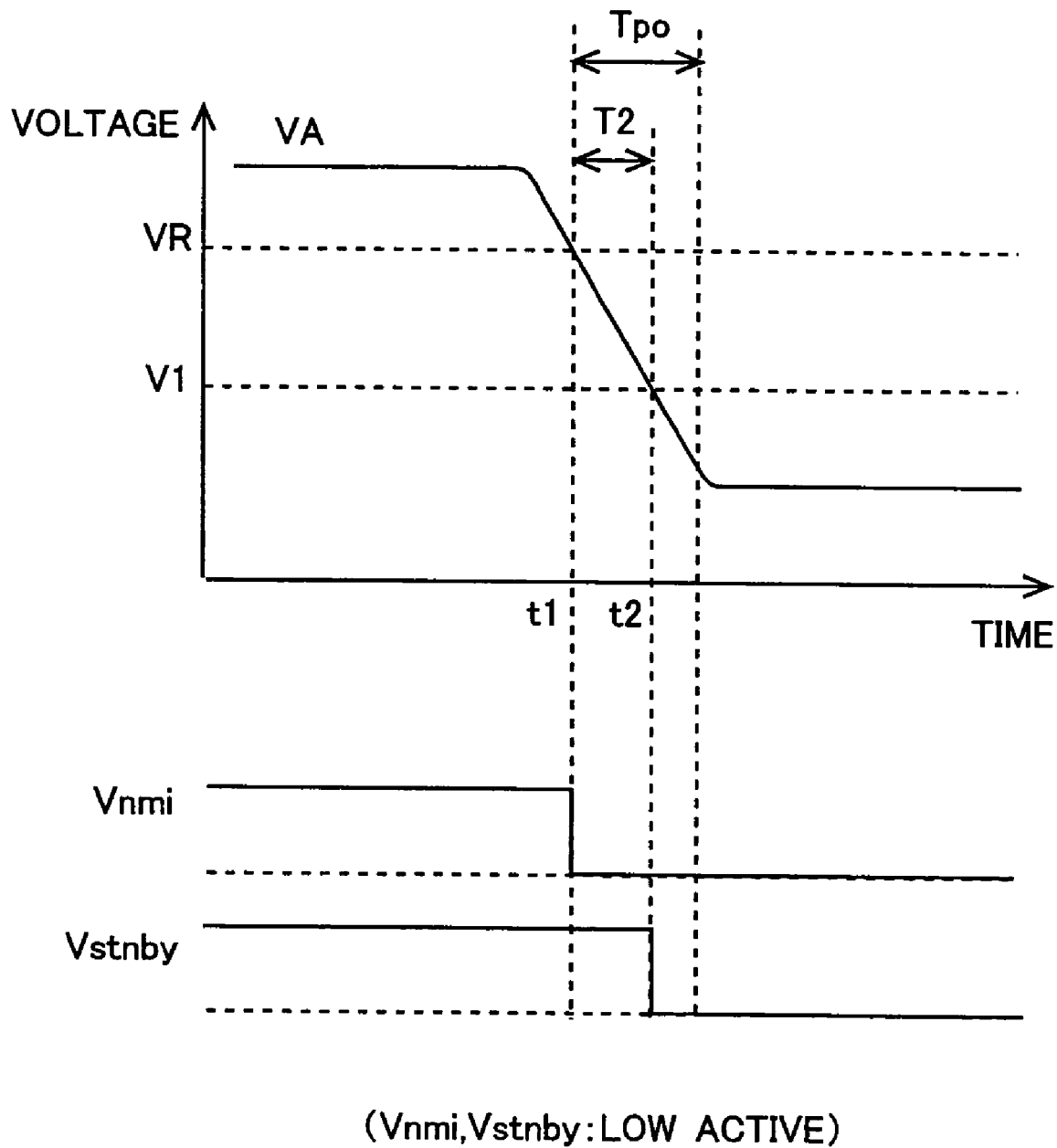
FIG. 8 is a timing diagram illustrating a problem inherent in the related art.

Referring now to FIG. 8, when the power supply voltage VA is equal to or lower than the predetermined voltage VR at the time t1, the microcontroller 1 according to the related art sets the low-active NMI signal Vnmi to the low level. Then, the CPU 3 performs a pre-backup processing operation for saving the register information in the internal RAM 31 according to the interrupt routine. In this case, the period Tpo is necessary to complete the pre-backup processing operation. Accordingly, the capacity of the smoothing capacitor of the power supply circuit, which supplies the power supply voltage VA, is sufficiently increased so as to secure a sufficient period for obtaining a voltage equal to or lower than the voltage V1 to cause the CPU 3 to shift to the standby state. However, as shown in FIG. 8, when the power supply voltage VA rapidly drops due to a failure or the like of the power supply circuit and when the power supply voltage VA becomes equal to or lower than the voltage V1 at the time t2 before the period Tpo expires, the pre-backup processing operation is finished in the middle of processing and the CPU is shifted to the standby state or reset. Assuming that a period between the time t1 and the time t2 is set as a period T2, Tpo>T2 is satisfied. In the period T2, the pre-backup processing operation is not completed, and thus the accuracy of the data backed up to the internal RAM 31 is not guaranteed.

In this manner, in the microcontroller 1, when the pre-backup processing operation is finished in the middle of processing, the data backed up to the internal RAM 31 is stored in an incomplete state. As a result, when the power supply voltage VA increases again to a voltage equal to or higher than the predetermined voltage VR and the microcontroller 1 performs the normal operation again based on the data stored in the internal RAM 31, it is highly possible that the microcontroller 1 malfunctions.

In this case, the microcontroller 100 according to the first exemplary embodiment includes the flag register 150 which enables the CPU 130 to determine whether the saving processing for stand-by is finished in the middle of processing or whether the system is reset. The CPU 130 checks the values of the flags stored in the flag register 150 during the return processing for returning from the standby state to the normal operation mode or during the return processing for returning from the reset state to the normal operation mode, thereby making it possible to determine whether the data backed up to the RAM 142 or the flash memory 143 is correct. Further, when determining that the saving processing for stand-by is finished in the middle of processing or when determining that the system is reset, the CPU 130 discards the backup data and initializes the microcontroller 100. Accordingly, the microcontroller 100 according to the first exemplary embodiment can prevent a malfunction from occurring after returning from the standby state.

Further, in the microcontroller 100 according to the first exemplary embodiment, it is not necessary for the smoothing capacitor of the power supply circuit (not shown) to have an unnecessarily large capacity, unlike the microcontroller 1 according to the related art.

Second Exemplary Embodiment

Figure 9:
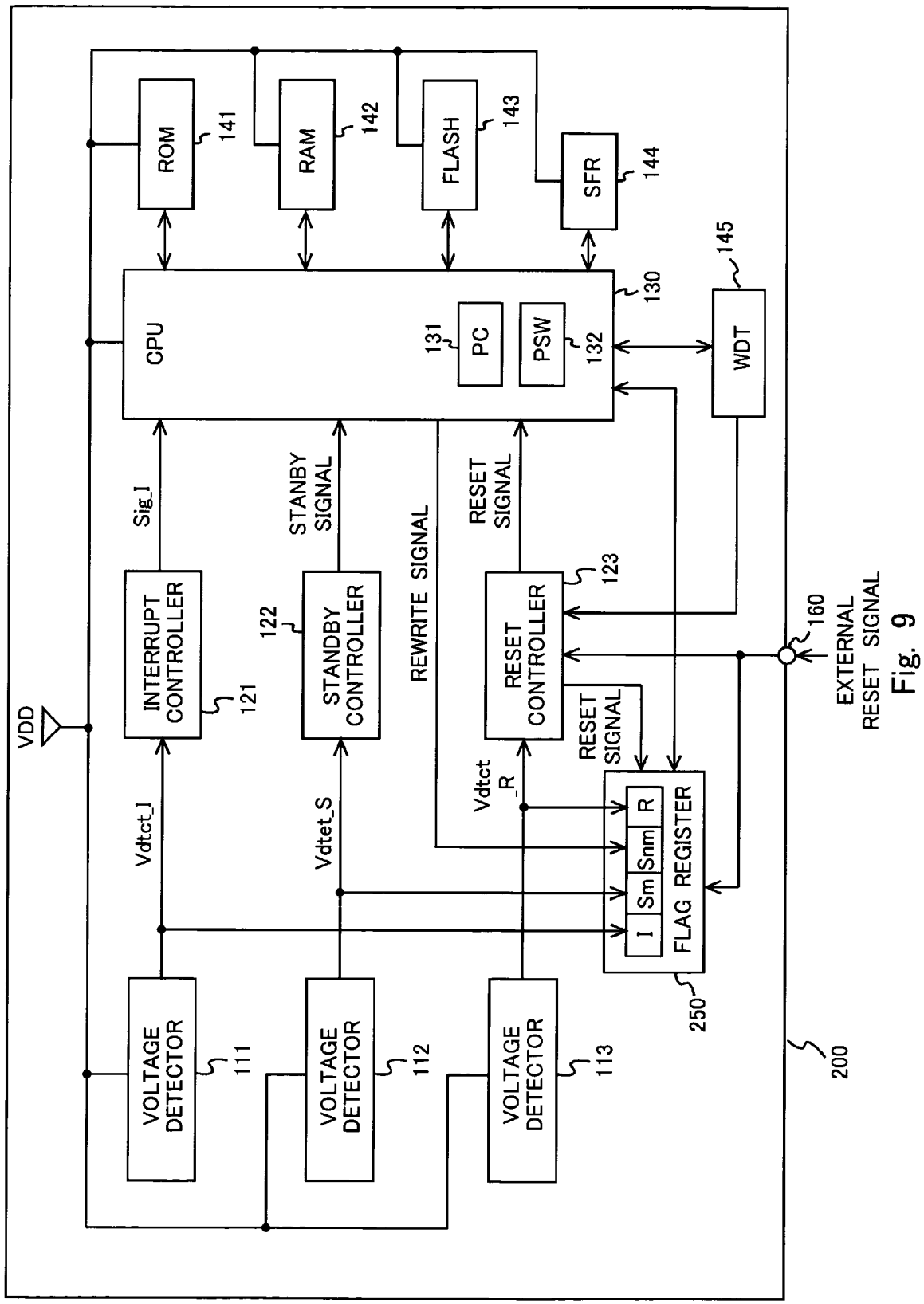
FIG. 9 shows an example of the configuration of a microcontroller according to a second exemplary embodiment of the present invention.

Hereinafter, a second exemplary embodiment of the present invention will be described in detail with reference to the drawings. FIG. 9 shows an example of the configuration of a microcontroller 200 according to the second exemplary embodiment.

As shown in FIG. 9, the microcontroller 200 includes the voltage detectors 111 to 113, the interrupt controller 121, the standby controller 122, the reset controller 123, the CPU 130, the ROM 141, the RAM 142, the flash memory 143, the special function register 144, a flag register 250, and the external reset signal input terminal 160.

Note that the components of FIG. 9 denoted by the same reference numerals as those of FIG. 1 are identical with or similar to the components of FIG. 1. The microcontroller according to the second exemplary embodiment is different from that of the first exemplary embodiment in the configuration of the flag register 250. Accordingly, the second exemplary embodiment is described by focusing on the difference.

The flag register 250 changes values of flags "I", "Sm", and "R" according to values of detection signals Vdtct_I, Vdtct_S, and Vdtct_R, which are respectively output from the voltage detectors 111 to 113, and stores the changed values. As in the first exemplary embodiment, when the detection signal Vdtct_I becomes high level, the value of the flag "I" changes from "0" to "1". When the detection signal Vdtct_S becomes high level, the value of the flag "Sm" changes from "0" to "1". When the saving processing for stand-by is fully completed by the microcontroller 200, the value of a flag "Snm" changes from "0" to "1" according to a rewrite signal output from the CPU 130. When the detection signal Vdtct_R becomes high level, the most significant bit of the flag "R" changes from "0" to "1", in a similar manner as in the first exemplary embodiment.

Note that, in a similar manner as in the first exemplary embodiment, each flag value changed when each of the detection signals becomes high level is not reset to "0" but is held at "1" even when each of the detection signals becomes low level. The CPU 130 having returned to the standby state checks the values of the flags, and performs the return processing according to the values. Then, after the microcontroller 200 has shifted to the normal operation mode, the CPU 130 initializes the flag register 250 and resets all the values of the flags to "0".

In this case, when the power supply voltage VDD becomes lower than the voltage VR, the flag register 250 is also reset. It is assumed that the value of the flag "R" is reset but is held at "1". It is also assumed that the flag register 250 includes a logic circuit that is operable at low voltage, and is capable of holding the stored values of the flags even when the power supply voltage VDD becomes lower than the voltage VR.

The CPU 130 checks the values of the flags stored in the flag register 250 during the return processing for returning from the standby state to the normal operation mode or during the return processing for returning from the reset state to the normal operation mode, and determines whether to use the backup data stored in the RAM 142 or the flash memory 143.

Figure 10:
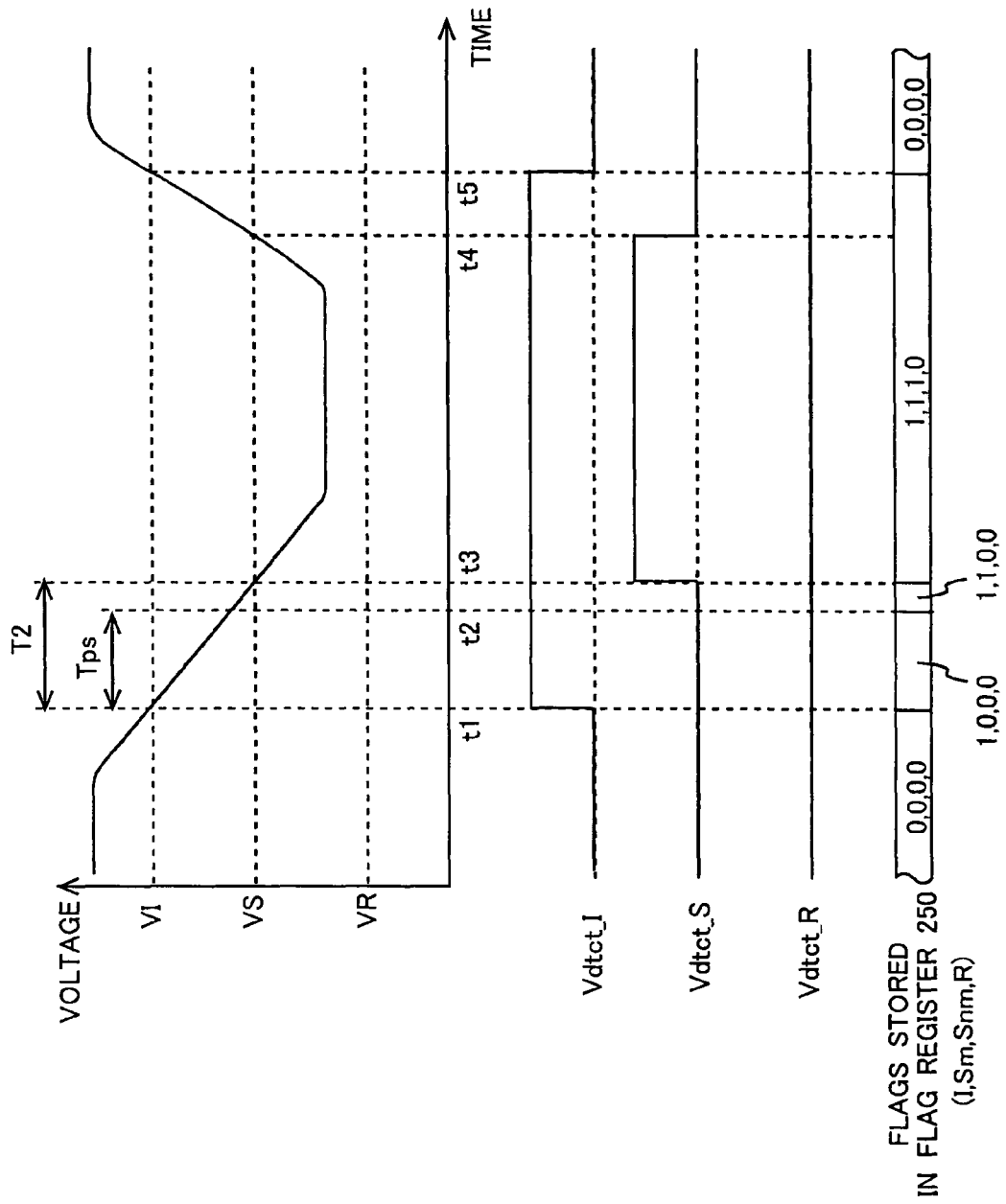
FIG. 10 is a timing diagram illustrating an operation of the microcontroller according to the second exemplary embodiment.
Figure 11:
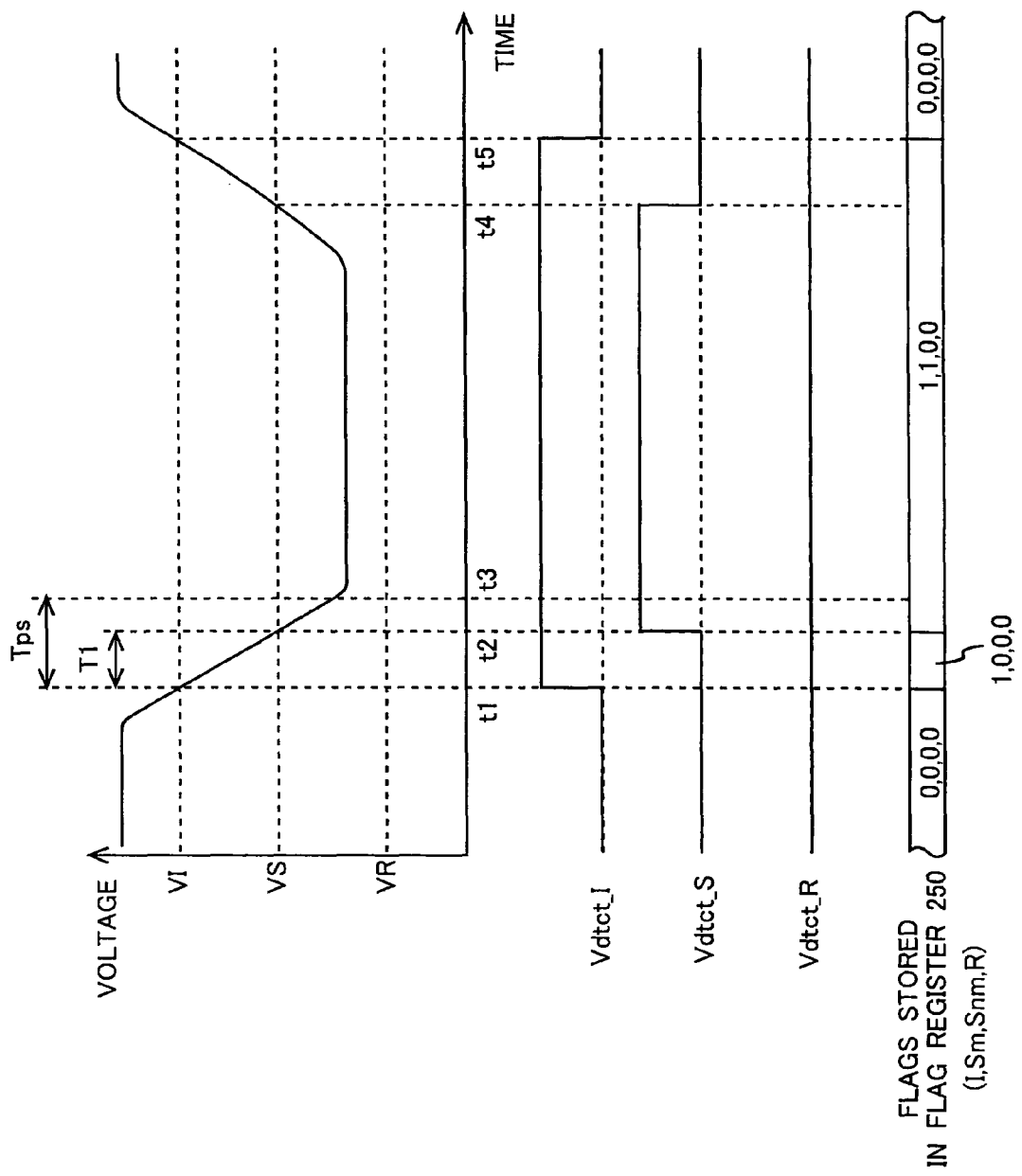
FIG. 11 is a timing diagram illustrating an operation of the microcontroller according to the second exemplary embodiment.
Figure 12:
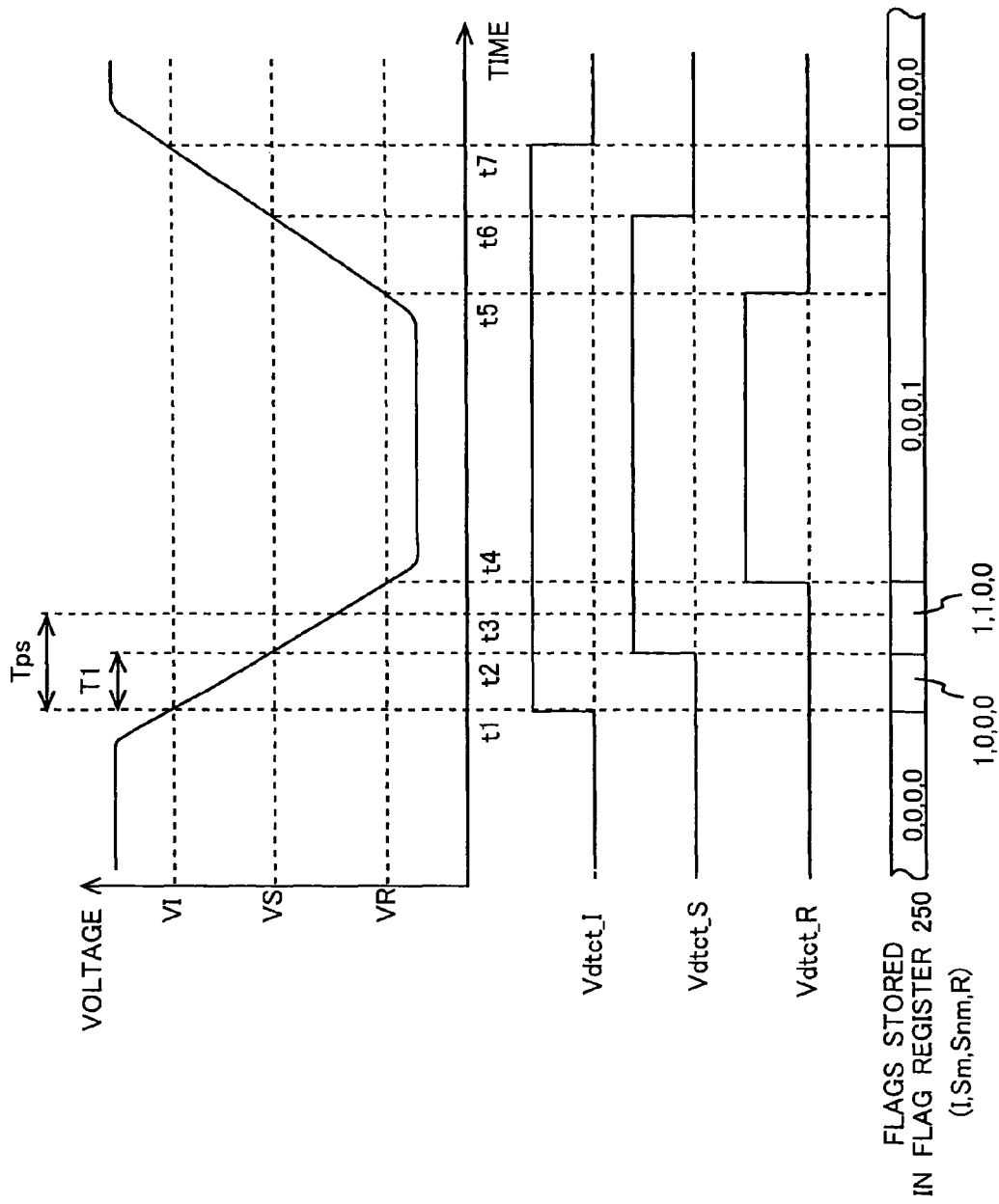
FIG. 12 is a timing diagram illustrating an operation of the microcontroller according to the second exemplary embodiment.

Next, operations of the microcontroller 200 according to the second exemplary embodiment will be described in detail with reference to the drawings. FIGS. 10, 11, and 12 show signal waveforms of the detection signals Vdtct_I, Vdtct_S, and Vdtct_R corresponding to three patterns in which the power supply voltage VDD drops and rises again, and also show the values of the flags stored in the flag register 250.

Note that, in the patterns in which the power supply voltage VDD is not reduced to a voltage equal to or lower than the voltage VS, that is, in the patterns of FIGS. 3 and 4 according to the first exemplary embodiment, only the value of the flag "I" of the flag register 250 changes from "0" to "1" and the value of each of the flags "Sm", "Snm", and "R" remains "0". Since the microcontroller 200 operates basically in the same manner as the microcontroller 100, a description thereof is omitted.

In a pattern shown in FIG. 10, before the time t1, the power supply voltage VDD is equal to or higher than the voltage VI. Accordingly, the microcontroller 200 performs the normal operation, and the CPU 130 performs the normal processing operation. At the time t1, the power supply voltage VDD becomes lower than the voltage VI. Thus, the voltage detector 111 outputs the detection signal Vdtct_I of high level to the interrupt controller 121. Further, the value of the flag "I", of the flag register 250 is rewritten from "0" to "1".

Upon receiving the high-level detection signal Vdtct_I, the interrupt controller 121 outputs the interrupt signal Sig_I to set the CPU 130 in the standby state. The CPU 130 interrupts the normal operating state in response to the interrupt signal Sig_I, and starts the saving processing for stand-by. The period Tps is necessary to complete the saving processing for stand-by. The saving processing for stand-by requires the period Tps, and is completed at the time t2. After the saving processing for stand-by is completed, the CPU 130 rewrites the value of the flag "Sm" of the flag register 250 from "0" to "1". After that, the CPU 130 shifts to the standby state, and the microcontroller 200 shifts to the standby mode.

At the time t3, the power supply voltage VDD decreases to a voltage equal to or lower than the voltage VS. Accordingly, the voltage detector 112 outputs the detection signal Vdtct_I of high level to the standby controller 122. Further, the value of the flag "Snm" of the flag register 250 is rewritten from "0" to "1". In this case, the period T2 between the time t1 and the time t3 is longer than the period Tps during which the saving processing for stand-by is completed. Thus, the microcontroller 200 has already shifted to the standby state by the time t3, and the CPU 130 has stopped operating. Therefore, the CPU 130 does not accept the standby signal from the standby controller 122.

After that, the power supply voltage VDD increases to a voltage higher than the voltage VS at the time t4, and further increases to a voltage higher than the voltage VI at the time t5. Accordingly, the voltage detector 111 outputs the detection signal Vdtct_I of low level to the interrupt controller 121 at the time t5. The interrupt controller 121 outputs the interrupt signal Sig_I corresponding to the detection signal Vdtct_I of low level, to the CPU 130. The CPU 130 having received the interrupt signal Sig_I starts the stand-by return processing for returning from the standby state to the normal operation. In the stand-by return processing, the CPU 130 checks the values of the flags stored in the flag register 250. Then, the CPU 130 confirms that the value of each of the flags "I", "Sm", and "Snm" is "1" and the value of the flag "R" is "0". As a result, the CPU 130 determines that the information saved in the RAM 142 and the flash memory 143 during the saving processing for stand-by is stored with correct values. After that, the CPU 130 uses the information saved in the RAM 142 and the flash memory 143 to return to the state immediately before the standby state. Further, the CPU 130 rests the flag register 250 after shifting to the normal operation mode.

Next, a pattern shown in FIG. 11 is described. Before the time t1, the pattern of FIG. 11 is similar to the pattern of FIG. 10. At the time t1, the power supply voltage VDD becomes lower than the voltage VI. After that, in a similar manner as in the pattern of FIG. 10, the CPU 130 interrupts the normal operation in response to the interrupt signal Sig_I from the interrupt controller 121, and starts the interrupt processing operation for shifting to the standby state. However, unlike the pattern shown in FIG. 10, the power supply voltage VDD decreases to a voltage lower than the voltage VS at the time t2 prior to the time t3 at which the saving processing for stand-by is completed. That is, the power supply voltage VDD decreases to a voltage lower than the voltage VS, from the time t1 during the period T1 which is shorter than the period Tps. Accordingly, the voltage detector 112 outputs the detection signal Vdtct_S of high level to the standby controller 122.

In response to the standby signal from the standby controller 122, the CPU 130 interrupts the saving processing for stand-by, and is forcibly shifted to the standby state. Further, at this time, the value of the flag "Sm" of the flag register 250 is rewritten from "0" to "1". In the pattern of FIG. 10, the saving processing for stand-by is completed and the value of the flag "Snm" of the flag register 250 is "1", while in the pattern of FIG. 11, the saving processing for stand-by is not completed, and thus the value of the flag "Snm" remains "0".

After that, the power supply voltage VDD increases to a voltage higher than the voltage VS at the time t4, and further increases to a voltage higher than the voltage VI at the time t5. Accordingly, at the time t5, the voltage detector 111 outputs the detection signal Vdtct_I of low level to the interrupt controller 121. The interrupt controller 121 outputs the interrupt signal Sig_I corresponding to the low-level detection signal Vdtct_I, to the CPU 130. The CPU 130 having received the interrupt signal Sig_I starts the stand-by return processing for returning from the standby state to the normal operation mode. In the stand-by return processing, the CPU 130 checks the values of the flags stored in the flag register 250. Then, the CPU 130 confirms that the value of each of the flags "I" and "Sm" is "1" and the value of each of the flags "Snm" and "R" is "0". As a result, the CPU 130 determines that the saving processing for stand-by is interrupted and the information saved in the RAM 142 and the flash memory 143 is not stored with correct values. After that, the CPU 130 discards the information saved in the RAM 142 and the flash memory 143, and initializes the system of the microcontroller 200.

Further, in a pattern shown in FIG. 12, in a similar manner as in the pattern of FIG. 11, the power supply voltage VDD decreases to a voltage lower than the voltage VS at the time t2 prior to the time t3 at which the saving processing for stand-by is fully completed. Accordingly, in a similar manner as in the pattern of FIG. 11, the CPU 130 interrupts the saving processing for stand-by, and is forcibly shifted to the standby state. At this time, the value of each of the flags "I" and "Sm" of the flag register 250 is "1" and the value of each of the flags "Snm" and "R" is "0".

Then, at the time t4, the power supply voltage VDD further decreases to a voltage lower than the voltage VR. Accordingly, the voltage detector 113 outputs the detection signal Vdtct_R of high level to the reset controller 123. Further, the value of the flag "R" of the flag register 250 is rewritten from "0" to "1".

Then, the reset controller 123 outputs the reset signal to the CPU 130 to reset the CPU 130. Subsequently, the RAM 142, the special function register 144, and the like are also reset, with the result that the system of the microcontroller 200 is reset. Note that the value of the flag "R" of the flag register 250 is not reset and is held at "1".

After that, the power supply voltage VDD increases to a voltage higher than the voltage VR at the time t5, and further increases to a voltage higher than the voltage VS at the time t6. Further, at the time t7, the power supply voltage VDD increases to a voltage higher than the voltage VI, and the CPU 130 starts the stand-by return processing for returning from the standby state to the normal operation mode, in a similar manner as in the pattern of FIG. 11. In the stand-by return processing, the CPU 130 checks the values of the flags stored in the flag register 250. Then, the CPU 130 confirms that the value of the flag "R" is "1". As a result, the CPU 130 determines that the system of the microcontroller 200 is reset. After that, the CPU 130 discards the information saved in the flash memory 143, and initializes the system of the microcontroller 200.

Note that the saving processing for stand-by may be fully completed by the microcontroller 200 before the power supply voltage VDD becomes lower than the voltage VS as in the pattern of FIG. 10, and thereafter, the power supply voltage VDD may decrease to a voltage lower than the voltage VR. In this case, by the time when the power supply voltage VDD becomes lower than the voltage VS, the value of the flag "Snm" of the flag register 250 is set to "1". When the power supply voltage VDD becomes lower than the voltage VR, however, values other than the value of the flag "R" are eventually reset to "0". Thus, the subsequent operations of the CPU 130 and the like are similar to those of FIG. 12. Accordingly, a detailed description with reference to the drawings is omitted.

Figure 13:
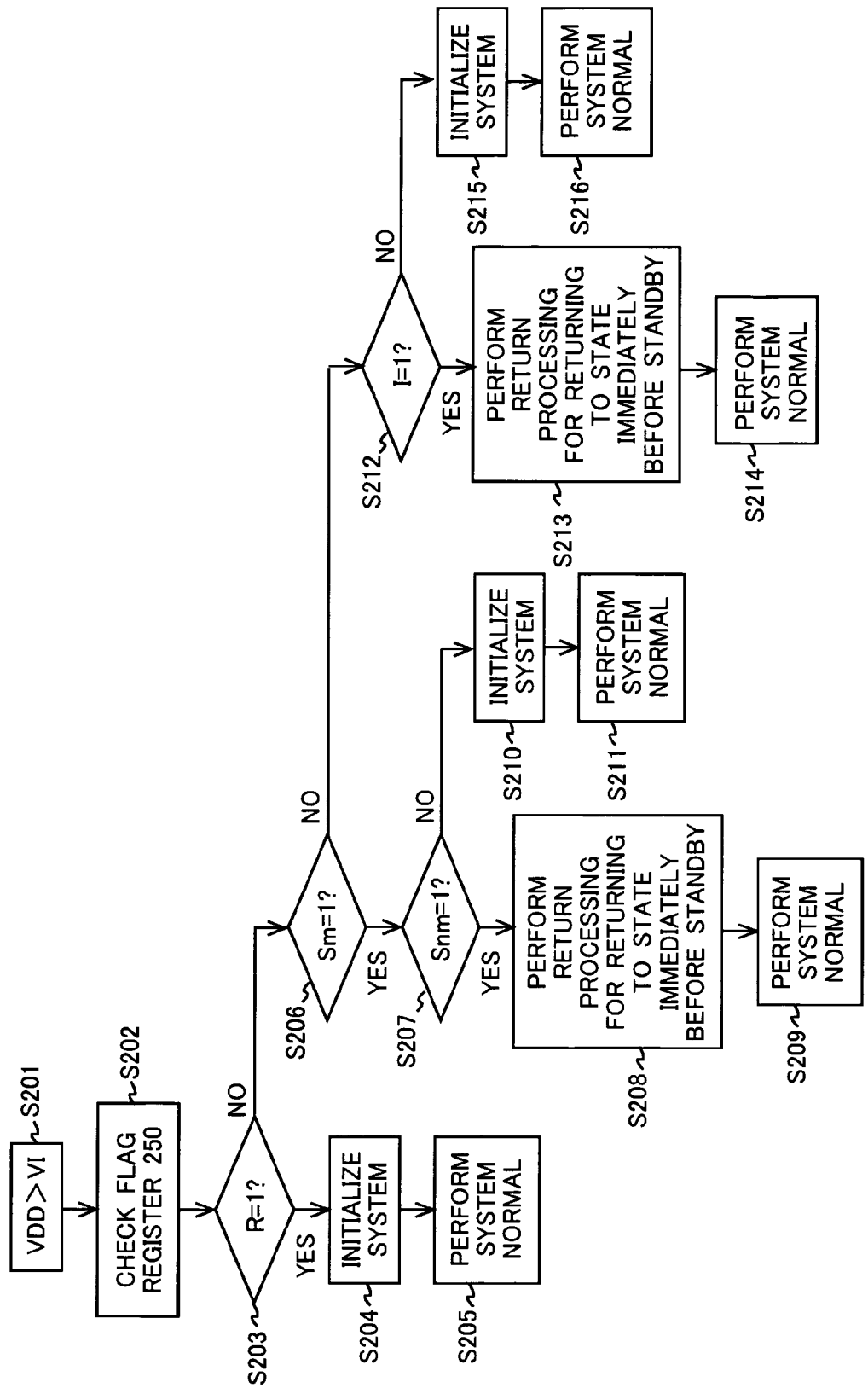
FIG. 13 is a flowchart illustrating a procedure for returning to a normal operation mode of the microcontroller according to the second exemplary embodiment.

Referring now to the flowchart of FIG. 13, a description is given of a procedure for the microcontroller 200 to return from the standby state to the normal operation mode operation. As shown in FIG. 13, when the power supply voltage VDD is higher than the voltage VI (S201), the CPU 130 checks the values of the flags stored in the flag register 250 (S202).

It is determined whether the value of the flag "R" is "1" (S203). When R=1 is satisfied (YES in S203), the CPU 130 assumes that the system is reset, and initializes the system of the microcontroller 200 (S204). After that, the microcontroller 200 performs the normal system operation (S205).

When R=1 is not satisfied but R=0 is established (NO in S203), the CPU 130 determines whether the value of the flag "Sm" is "1" (S206). When Sm=1 is satisfied (YES in S206), the CPU 130 further determines whether the value of the flag "Snm" is "1" (S207). When Snm=1 is satisfied (YES in S207), the CPU assumes that the saving processing for stand-by is completed, and performs the return processing for returning to the state immediately before the standby state, based on the information backed up to the RAM 142 and the like (S208). After that, the microcontroller 200 performs the normal system operation (S209).

When Snm=1 is not satisfied but Snm=0 is established (NO in S207), the CPU 130 assumes that the saving processing for stand-by is finished in the middle of processing, and initializes the system of the microcontroller 200 (S210). After that, the microcontroller 200 performs the normal system operation (S211).

On the other hand, when Sm=1 is not satisfied but Sm=0 is established (NO in S206), the CPU 130 determines whether the value of the flag "I" is "1" (S212). When I=1 is satisfied (YES in S212), the CPU 130 assumes that the saving processing for stand-by is completed, and performs the return processing for returning to the state immediately before the standby state, based on the information backed up to the RAM 142 and the like (S213). After that, the microcontroller 200 performs the normal system operation (S214).

When I=1 is not satisfied but I=0 is established (NO in S215), the microcontroller 200 is in an initial state of power up, and thus the CPU 130 initializes the system of the microcontroller 200 (S215). After that, the microcontroller 200 performs the normal system operation (S216).

As described above, in the microcontroller 200 according the second exemplary embodiment, the flag "Sm" indicating whether the power supply voltage VDD becomes lower than the voltage VS, and the flag "Snm" indicating that the saving processing for stand-by is completed are provided for the flag register 250. Accordingly, by checking the values of the flags "Snm" and "Sm" during the stand-by return processing for returning from the standby state to the normal operation mode, the CPU 130 can determine whether the saving processing for stand-by is completed or whether the saving processing for stand-by is finished in the middle of processing. As a result, it is only necessary to perform processing for rewriting the flags of the flag register 250. Further, it is not necessary to provide a mask processing operation for the flag register 150 and a system therefor, or operation stop processing for the voltage detector 112 and a system therefor, unlike the microcontroller 100 according to the first exemplary embodiment.

After that, when the value of each of flags "Snm" and "Sm" is "1", the CPU 130 uses the data backed up to the RAM 142 or the flash memory 143 to return to the state immediately before the standby state. On the other hand, when the value of the flag "Snm" is "0" and the value of the flag "Sm" is "1", the CPU 130 discards the data backed up to the RAM 142 or the flash memory 143, and initializes the microcontroller 200. Therefore, as in the first exemplary embodiment, the microcontroller 200 can prevent a malfunction from occurring after returning from the standby state. The other effects of the present invention are the same as those of the first exemplary embodiment.

Note that the present invention is not limited to the above exemplary embodiments, and various modifications can be made without departing from the gist of the present invention. For example, the microcontroller may be formed of a single chip.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A microcontroller comprising:
   a first voltage detection circuit that generates a first detection signal when a power supply voltage decreases to a voltage equal to or lower than a first voltage value;
   a second voltage detection circuit that generates a second detection signal when the power supply voltage decreases to a voltage equal to or lower than a second voltage value, the second voltage value being smaller than the first voltage value;
   a central processing circuit that has a function of switching between a normal operation mode to carry out a normal operation and a standby mode to operate with power consumption lower than that necessary for the normal operation, performs an interrupt processing operation to shift from the normal operation mode to the standby mode when the first detection signal is generated, and shifts to the standby mode independent from the interrupt processing operation when the second detection signal is generated; and
   a first memory circuit that stores information indicating that the central processing circuit has shifted to the standby mode before completing the interrupt processing operation.

2. The microcontroller according to claim 1, further comprising a second memory circuit, wherein:
   the interrupt processing operation is a backup processing operation executed by the central processing circuit to back up, to the second memory circuit, information necessary for returning from the standby mode to the normal operation mode; and the information stored in the first memory circuit is information indicating that the central processing circuit has shifted to the standby mode before completing the backup processing operation.

3. The microcontroller according to claim 2, further comprising a third voltage detection circuit that generates a third detection signal when the power supply voltage decreases to a voltage equal to or lower than a third voltage value, the third voltage value being smaller than the second voltage value, wherein the central processing circuit is reset when the third detection signal is generated.

4. The microcontroller according to claim 3, wherein the first memory circuit further stores information indicating that the third detection signal is generated.

5. The microcontroller according to claim 3, further comprising:
an interrupt control circuit that receives the first detection signal and outputs an interrupt signal to cause the central processing circuit to perform the interrupt processing operation;
a standby control circuit that receives the second detection signal and outputs a standby signal to cause the central processing circuit to shift to the standby mode independent from the interrupt processing operation; and
a reset circuit that receives the third detection signal and outputs a reset signal to reset the central processing circuit.

6. The microcontroller according to claim 3, wherein:
the first memory circuit stores:
first information indicating that the first voltage detection circuit has generated the first detection signal;
second information indicating that the second voltage detection circuit has generated the second detection signal;
third information indicating that the central processing circuit has completed the interrupt processing operation; and
fourth information indicating that the third voltage detection circuit has generated the third detection signal.

7. The microcontroller according to claim 2, wherein the central processing circuit having returned from the standby mode to the normal operation mode does not use the information backed up to the second memory circuit, when the first memory circuit stores information indicating that the central processing circuit has shifted from the standby mode before completing the backup processing operation.

8. The microcontroller according to claim 2, wherein the central processing circuit having returned from the standby mode to the normal operation mode uses the information backed up to the second memory circuit, when the first memory circuit stores no information indicating that the central processing circuit has shifted to the standby mode before completing the backup processing operation.

9. The microcontroller according to claim 4, wherein the central processing circuit having returned from the standby mode to the normal operation mode resets the second memory circuit, when the first memory circuit stores information indicating that the third detection signal is generated.

10. A microcontroller comprising:
a first voltage detection circuit that generates a first detection signal when a power supply voltage decreases to a voltage equal to or lower than a first voltage value;
a second voltage detection circuit that generates a second detection signal when the power supply voltage decreases to a voltage equal to or lower than a second voltage value, the second voltage value being smaller than the first voltage value;
a first memory circuit; and
a central processing circuit, wherein
the central processing circuit has a function of switching between a normal operation mode to carry out a normal operation at a voltage equal to or higher than the second voltage value and a low power consumption mode to operate at a voltage equal to or lower than the second voltage value with lower power consumption than in the normal operation mode,
the central processing circuit performs an interrupt processing operation to shift from the normal operation mode to the low consumption mode when the first detection signal is generated,
the central processing circuit shifts to the low power consumption mode independent from the interrupt processing operation when the second detection signal is generated, before completing the interrupt processing operation,
the first memory circuit stores information indicating that the central processing circuit has shifted to the low power consumption mode before completing the interrupt processing operation,
the microcontroller further comprises a second memory circuit,
the interrupt processing operation is a backup processing operation executed by the central processing circuit to back up, to the second memory circuit, information necessary for returning from the low power consumption mode to the normal operation mode,
the information stored in the first memory circuit is information indicating that the central processing circuit has shifted to the low power consumption mode before completing the backup processing operation,
the microcontroller further comprises a third voltage detection circuit that generates a third detection signal when the power supply voltage decreases to a voltage equal to or lower than a third voltage value, the third voltage value being smaller than the second voltage value,
the central processing circuit is reset when the third detection signal is generated, and
the microcontroller further comprises:
an interrupt control circuit that receives the first detection signal and outputs an interrupt signal to cause the central processing circuit to perform the interrupt processing operation;
a low power consumption mode control circuit that receives the second detection signal and outputs a low power consumption mode signal to cause the central processing circuit to shift to the low power consumption mode independent from the interrupt processing operation; and
a reset circuit that receives the third detection signal and outputs a reset signal to reset the central processing circuit.

11. The microcontroller according to claim 10, wherein the first memory circuit stores:
first information indicating that the first voltage detection circuit has generated the first detection signal;
second information indicating that the second voltage detection circuit has generated the second detection signal;
third information indicating that the central processing circuit has completed the interrupt processing operation; and fourth information indicating that the third voltage detection circuit has generated the third detection signal.

12. The microcontroller according to claim 10, wherein the first memory circuit further stores information indicating that the third detection signal is generated.

13. The microcontroller according to claim 12, wherein the central processing circuit having returned from the low power consumption mode to the normal operation mode resets the second memory circuit, when the first memory circuit stores information indicating that the third detection signal is generated.

14. The microcontroller according to claim 10, wherein the central processing circuit having returned from the low power consumption mode to the normal operation mode does not use the information backed up to the second memory circuit, when the first memory circuit stores information indicating that the central processing circuit has shifted from the low power consumption mode before completing the backup processing operation.

15. The microcontroller according to claim 10, wherein the central processing circuit having returned from the low power consumption mode to the normal operation mode uses the information backed up to the second memory circuit, when the first memory circuit stores no information indicating that the central processing circuit has shifted to the low power consumption mode before completing the backup processing operation.

16. A microcontroller comprising:
a first voltage detection circuit that generates a first detection signal when a power supply voltage decreases to a voltage equal to or lower than a first voltage value;
a second voltage detection circuit that generates a second detection signal when the power supply voltage decreases to a voltage equal to or lower than a second voltage value, the second voltage value being smaller than the first voltage value;
a first memory circuit; and
a central processing circuit, wherein
the central processing circuit has a function of switching between a normal operation mode to carry out a normal operation at a voltage equal to or higher than the second voltage value and a low power consumption mode to operate at a voltage equal to or lower than the second voltage value with lower power consumption than in the normal operation mode, the central processing circuit performs an interrupt processing operation to shift from the normal operation mode to the low consumption mode when the first detection signal is generated, the central processing circuit shifts to the low power consumption mode independent from the interrupt processing operation when the second detection signal is generated, before completing the interrupt processing operation, the first memory circuit stores information indicating that the central processing circuit has shifted to the low power consumption mode before completing the interrupt processing operation, the microcontroller further comprises a second memory circuit, the interrupt processing operation is a backup processing operation executed by the central processing circuit to back up, to the second memory circuit, information necessary for returning from the low power consumption mode to the normal operation mode, the information stored in the first memory circuit is information indicating that the central processing circuit has shifted to the low power consumption mode before completing the backup processing operation, the microcontroller further comprises a third voltage detection circuit that generates a third detection signal when the power supply voltage decreases to a voltage equal to or lower than a third voltage value, the third voltage value being smaller than the second voltage value, the central processing circuit is reset when the third detection signal is generated, and the first memory circuit stores:
first information indicating that the first voltage detection circuit has generated the first detection signal;
second information indicating that the second voltage detection circuit has generated the second detection signal;
third information indicating that the central processing circuit has completed the interrupt processing operation; and
fourth information indicating that the third voltage detection circuit has generated the third detection signal.

* * * * *